United States Patent
Visoz et al.

(10) Patent No.: US 7,804,885 B2
(45) Date of Patent: *Sep. 28, 2010

(54) ITERATIVE VECTOR EQUALIZATION FOR CDMA COMMUNICATIONS SYSTEMS ON THE MIMO CHANNEL

(75) Inventors: Raphael Visoz, Issy les Moulineaux (FR); Antoine Berthet, Chatenay Malabry (FR)

(73) Assignee: France Telecom, Paris (FR)

( * ) Notice: Subject to any disclaimer, the term of this patent is extended or adjusted under 35 U.S.C. 154(b) by 568 days.

This patent is subject to a terminal disclaimer.

(21) Appl. No.: 11/587,225

(22) PCT Filed: Apr. 21, 2005

(86) PCT No.: PCT/EP2005/004409
§ 371 (c)(1),
(2), (4) Date: Oct. 23, 2006

(87) PCT Pub. No.: WO2005/114864
PCT Pub. Date: Dec. 1, 2005

(65) Prior Publication Data
US 2007/0223358 A1 Sep. 27, 2007

(30) Foreign Application Priority Data
Apr. 22, 2004 (EP) ................... 04291038

(51) Int. Cl.
*H04L 1/00* (2006.01)
*H04L 1/06* (2006.01)
*H04B 7/00* (2006.01)
(52) U.S. Cl. .................. 375/148; 375/144; 375/346
(58) Field of Classification Search ............... 375/130, 375/147, 148, 144, 260, 340, 348, 346; 370/201, 370/335, 339
See application file for complete search history.

(56) References Cited

U.S. PATENT DOCUMENTS
6,993,070 B1 * 1/2006 Berthet et al. ............... 375/232
(Continued)

FOREIGN PATENT DOCUMENTS
FR 2 841 068 A 12/2003

OTHER PUBLICATIONS
Jia Shen and Alistyer G. Burr, "Iterative Multi-User-Antenna Detector for MIMO CDMA Employing Space-Time Turbo Codes", University of York, UK, 2002 IEEE.*
(Continued)

*Primary Examiner*—Chieh M Fan
*Assistant Examiner*—Aristocratis Fotakis
(74) *Attorney, Agent, or Firm*—Cohen Pontani Lieberman & Pavane LLP

(57) ABSTRACT

The invention relates to a reception method for communication over frequency-selective channels with a plurality of send antennas and a plurality of receive antennas, to process data received by the receive antennas that, on sending, was successively modulated and spread.

To this end, reception uses:
filtering by means of a single linear filter (202, 202') adapted to process the received data to generate a vector corresponding to an evaluation (Ŝ) of the sent modulated data before spreading;
subtracting interference using an estimate of multi-antenna interference (MAI), intersymbol interference (ISI), and multi-user interference (MUI) previously regenerated on the basis of the vector (Ŝ) generated by previous filtering (202);
processing to generate an interference estimate for the data received from information computed on the basis of the vector (Ŝ).

The invention relates further to a reception system adapted to implement the method and a transmission system including the reception system.

29 Claims, 4 Drawing Sheets

U.S. PATENT DOCUMENTS

| | | | | |
|---|---|---|---|---|
| 7,330,519 | B2* | 2/2008 | Leclair | 375/316 |
| 2002/0018529 | A1* | 2/2002 | Dabak et al. | 375/267 |
| 2002/0168017 | A1 | 11/2002 | Visoz et al. | |
| 2002/0181555 | A1* | 12/2002 | Roumy et al. | 375/147 |
| 2004/0062302 | A1* | 4/2004 | Fujii et al. | 375/232 |
| 2004/0116077 | A1* | 6/2004 | Lee et al. | 455/101 |
| 2004/0228423 | A1* | 11/2004 | Gueguen | 375/341 |
| 2005/0031024 | A1* | 2/2005 | Yang et al. | 375/219 |
| 2005/0078761 | A1* | 4/2005 | Hottinen et al. | 375/267 |
| 2005/0175131 | A1* | 8/2005 | Kansanen et al. | 375/350 |
| 2006/0251149 | A1* | 11/2006 | Fujii | 375/146 |

OTHER PUBLICATIONS

A.G. Lillie A.Prado Miguelez, A.R. Nix and J.P.McGeehan, "A Comparison of Multi-Carrier OFDM and Single Carrier Iterative Equalisation for Future High Performance Wireless Local Area Networks", University of Bristol, UK, 2002 IEEE.*

Hongbin Li, Xuguang Lu, Giannakis, G.B, "Capon multiuser receiver for CDMA systems with space-time coding", Stevens Institute of Technology, Hoboken, NJ, May 2002, IEEE.*

R. Visoz, A.O. Berthet, "Iterative Decoding and Channel Estimation for Space-Time BICM over MIMO Block Fading Multipath AWGN Channel," IEEE Trans. Commun., vol. 51, No. 8, pp. 1358-1367, Aug. 2003.*

N. Nefedov, M. Pukkila, R. Visoz, and A.O. Berthet, "Terative Receiver Concept for TDMA Packet Data Systems", European Trans. on Telecommun., vol. 14, pp. 457-469, Sep.-Oct. 2003.*

France Telecom, "Iterative receiver architectures for MIMO HSDPA", Rev-WS-032, presented at 3GPP Future Evolution Workshop, Toronto, Nov. 2-3, 2004.*

M. Witzke et al., Institute of Electrical and Electronics Engineers: "Iterative detection of MIMO signals with linear detectors", Conference Record of the 36th Asilomar Conference on Signals, Systems, & Computers, Pacific Groove, CA, Nov. 3-6, 2002: IEEE, US, vol. 1 of 2 Conf. 36, pp. 289-293.

* cited by examiner

ITERATIVE VECTOR EQUALIZATION FOR CDMA COMMUNICATIONS SYSTEMS ON THE MIMO CHANNEL

RELATED APPLICATIONS

This is a U.S. National Phase Application under 35 USC 371 of International Application PCT/EP2005/004409, filed on Apr. 21, 2005.

GENERAL TECHNICAL FIELD

The present invention relates to the field of digital communications. It concerns how to decode efficiently digital data transmitted on a frequency-selective MIMO channel at the same time as optimizing the performance/complexity trade-off. FIG. 1 shows an overall method of transmission on a frequency-selective MIMO channel 300 between a sender 100 with T send antennas, delivering signals x[n] at the time n, and a receiver 200 with R receive antennas, receiving signals y[n] at the time n.

GENERAL DESCRIPTION OF THE PRIOR ART

Any communications system managing the access of multiple users to the same channel by allocating specific spreading codes (CDMA) is limited in capacity by multi-user interference (MUI) between users. In the context of the present invention, transmission is envisaged on a channel liable to generate other kinds of interference such as spatial multi-antenna interference (MAI) caused by multiple send antennas and intersymbol interference (ISI) caused by the frequency selectivity of the channel. On reception, these various kinds of interference are cumulative and make recovering the useful information difficult.

Pioneering work carried out by S. Verdu in the 1980s clearly demonstrated the benefit of exploiting the structural properties of multi-user interference (MUI), multi-antenna interference (MAI) and intersymbol interference (ISI) to improve performance for a fixed load (the number of users per chip) or to improve the load for fixed performance.

Many types of linear detectors have been studied, capable of supporting a greater or lesser load, which load may be evaluated analytically under asymptotic conditions. Without recourse to iterative techniques, the performance of these detectors falls far short of the performance of a maximum likelihood (ML) detector (for a system with or without coding).

The class of non-linear LIC-ID detectors based on linear iterative cancellation of the interference thus offers an excellent trade-off between performance and complexity. LIC-ID detectors use the following functions: linear filtering, weighted regeneration of interference (regardless of its nature), subtraction of the regenerated interference from the received signal. They deliver decisions on the modulated data (or symbols) transmitted with a reliability that increases in monotonous fashion with each new attempt. LIC-ID detectors which are intended to eliminate ISI (at block level) asymptotically achieve the performance of an optimum ML detector with a computation complexity similar to that of a linear equalizer. LIC-ID detectors intended to combat MUI approximate the performance of the optimum ML detector with a computation complexity comparable to that of a simple linear detector.

A remarkable feature of LIC-ID detectors is that they can easily be combined with hard or weighted decisions delivered by the channel decoder, thus effecting separate and iterative detection and decoding of the data.

For CDMA systems that are overloaded (by hypothesis by MUI) transmitting on frequency-selective MIMO channels, the level of interference is such that using LIC-ID receivers proves essential. If an iterative strategy is selected, the complexity of the receivers can be reduced, and rendered reasonable, only by simplifying the iterative processing as much as possible. LIC-ID detectors are treated separately for ISI and for MUI in reference [1] (see below) and in the case of ISI+MUI in reference [2] (see below).

[1] A. M. Chan, G. W. Wornell, "A New Class of Efficient Block-Iterative Interference Cancellation Techniques for Digital Communication Receivers", IEEE J. VLSI Signal Processing (Special Issue on Signal Processing for Wireless Communication Systems), vol. 30, pp. 197-215, January-March 2002.

[2] W. Wang, V. H. Poor, "Iterative (Turbo) Soft Interference Cancellation and Decoding for Coded CDMA", IEEE Trans. Commun., vol. COM-47, no. 9, pp. 2356-2374, September 1999.

Their generalization to MUI+MAI+ISI still constitutes an open subject of research, in particular because of the complexity of the processing to be effected, implying computations on particularly large matrices.

An interesting approach consists in exploiting the ambiguity inherent to any internal linear coding (or spreading process), which may be seen interchangeably as multiple access to K users or K-dimensional linear modulation. The K-dimensional point of view suggests implementing on reception vectorial equalization of K-dimensional symbols. To interact with the channel decoder, it remains to determine the a posteriori probabilities on each bit of each equalized K-dimensional symbol.

A sphere decoding algorithm using lists has recently been proposed in reference [3] (see below) to solve this type of problem for the iterative decoding of interleaved coded modulations on ergotic MIMO channels that are not frequency-selective. This algorithm yields performance close to the performance that could be obtained by direct implementation of the MAP criterion, with a complexity that is broadly polynomial with respect to the number of antennas.

[3] B. M. Hochwald, S. Ten Brink "Achieving Near-Capacity on a Multiple-Antenna Channel", IEEE Trans. Commun. Vol. CON-51, no. 3, pp. 389-399, May 2003.

The present invention exploits the existence of this algorithm, adapting it to an entirely different context.

SUMMARY OF THE INVENTION

A first aspect of the invention proposes a receiving method according to any one of claims 1 to 22.

A second aspect of the invention proposes a transmission system according to claim 23.

A third aspect of the invention proposes a receiving method according to any one of claims 24 to 29.

An object of the present invention is to propose a receiver for "multicode" CDMA transmission (K>T) and/or overloaded CDMA transmission (K users, spreading factor N<K) on frequency-selective MIMO channels (T send antennas and R receive antennas), on the general assumption of there being no CSI (i.e. no information as to the state of the channel) at the sender and a perfect knowledge of the CSI at the receiver. The receiver is based on a combination of simple mechanisms and techniques to obtain the best possible quality of service at fixed spectral efficiency and signal-to-noise ratio (SNR) or the best possible usable bit rate at fixed quality of service, band and SNR.

To this end, the invention proposes an iterative decoding and equalization device including a data detector receiving data from the various send antennas comprising:

a single linear filter for generating statistics on the K-dimensional symbolic vectors sent taking account of the spatial diversity offered by the R receive antennas;

means for subtracting from the received signal the interference regenerated on the basis of estimates of the available K-dimensional symbolic vectors sent, before any linear filtering;

means for processing the K-dimensional output of the linear filter in order to generate probabilistic information at the bit level that can be used for external decoding;

external decoding with weighted inputs and outputs capable of generating probabilistic information referred to as extrinsic information pertinent to the computation of the estimates of the data sent (in the sense of the criterion minimizing the mean square error (MMSE));

means for recursively concatenating the output of the external decoder with the interference regenerator.

DESCRIPTION OF THE DRAWINGS

Other features and advantages of the invention will emerge from the following description, which is purely illustrative and non-limiting and should be read with reference to the appended drawings in which.

DESCRIPTION OF A PREFERRED EMBODIMENT OF THE PRESENT INVENTION

1. General Structure of the Sender

Reception is intimately linked to the sending mode, which can be defined by a modulation/coding scheme of high spectral efficiency, and high adaptability capacity, based on the use of spread spectrum modulation and on the use of multiple send and receive antennas. The proposed solution is pertinent assuming no knowledge of the send channel (no CSI) and a perfect knowledge of the receive channel (CSI). The communications model is briefly described below in order to introduce a third embodiment of the present invention.

Figure 1:
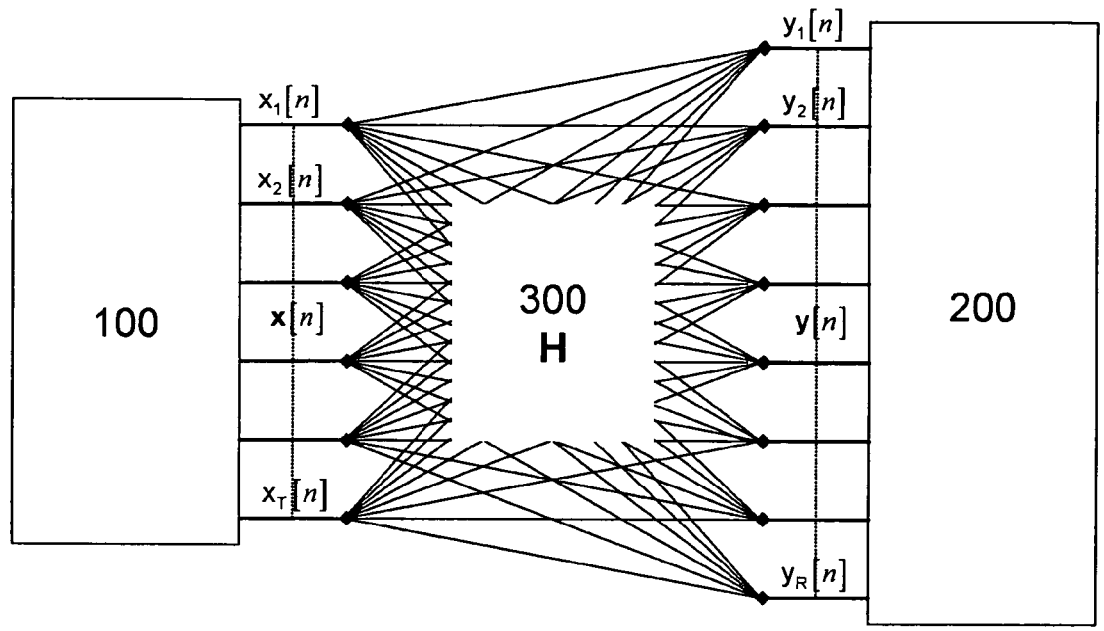
FIG. 1 illustrates a general concept of transmission on a frequency-selective MIMO channel.
Figure 2:
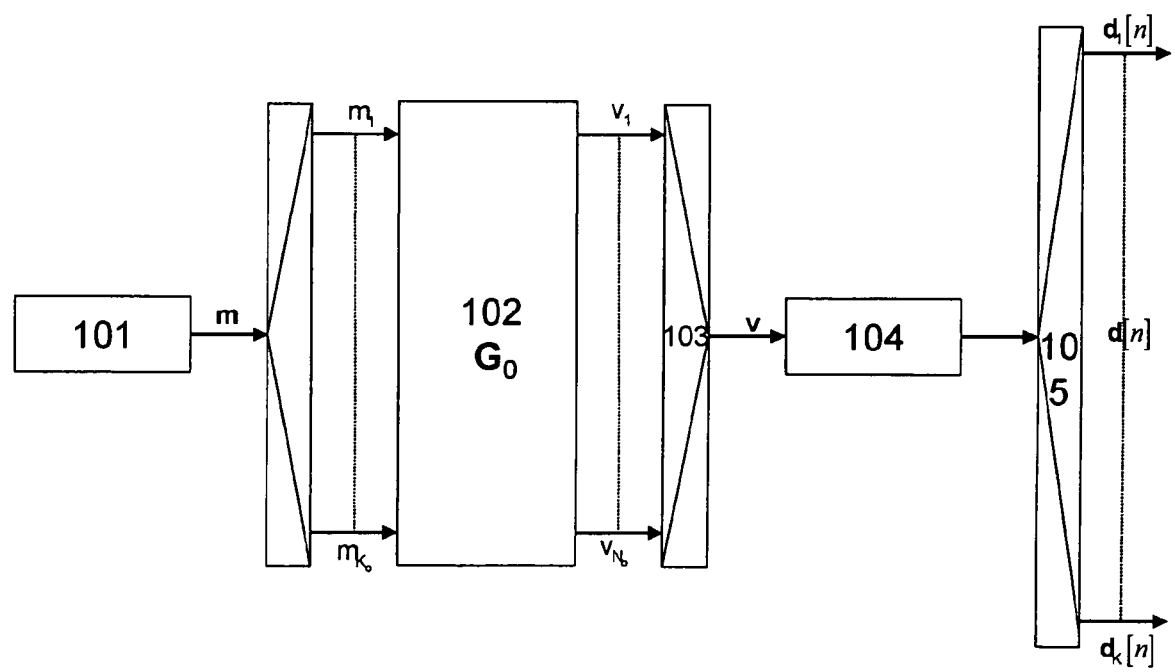
FIG. 2 shows a first part of a sending process, including external channel coding of digital information, bit interleaving, and demultiplexing into K streams (one for each potential user)

Referring to FIG. 2, the useful digital data is collected and grouped into a message m of $K_o$ bits constituting the send digital data source 101. In each message m, a linear external code $C_o$ having an $N_o \times K_o$ generator matrix $G_o$ and constructed on $F_2$ assigns at 102 a code word v of length $N_o$ bits defined by the matrix equation:

$$v = G_o m$$

The external coding yield is:

$$\rho = \frac{K_o}{N_o}$$

The length $N_o$ of the code words is linked to the various parameters of the system by the equation:

$$N_o = K \times L \times q$$

in which K designates the total number of potential users, L the length of the packets (in symbol times) and q the number of bits per modulation symbol. The code may be of any type, for example a convolutional code, a turbocode, an LDPC code, etc. In a multiple access type configuration, the message m consists in a plurality of multiplexed messages from different sources. Coding is effected independently on each component message. The code word v results from the concatenation 103 of the various code words produced.

The code word v is sent to an interleaver 104 operating at the bit level and, where appropriate, having a particular structure. In a multiple access type configuration, the interleaving acts piece by piece on the various code words placed one after the other. The output of this interleaver is broken up into K×L sets of q bits called integers.

The stream of integers is demultiplexed 105 onto K separate channels, where K may be chosen arbitrarily to be strictly greater than the number T of send antennas. The output from this operation is a K×L integer matrix D. The L columns d[n] n=0, ..., L−1 of this matrix D have the following structure:

$$d[n] = [d_1[n]^T d_2[n]^T \ldots d_K[n]^T]^T \in F_2^{qK}$$

in which the component integers $d_k[n]$ k=1, ..., K are themselves structured as follows:

$$d_k[n] = [d_{k,1}[n]\, d_{k,2}[n] \ldots d_{k,q}[]]^T \in F_2^q$$

The integers $d_k[n]$ of the matrix D are then individually modulated 107 via a modulation table $\mu: F_2^q \mapsto \mathfrak{J}$ to yield modulated data, or more precisely complex symbols $s_k[n]$ of a constellation $\mathfrak{J} \subset \mathbb{C}$ with $Q = 2^q$ elements. This transforms the integer matrix D into a K×L complex matrix S the L columns s[n] n=0, ..., L−1 whereof are structured as follows:

$$s[n] \triangleq \mu(d[n]) = [s_1[n]\, s_2[n] \ldots s_K[n]]^T \in \mathfrak{J}^K$$

It is useful to specify the following inverse relationships:

$$\mu^{-1}(s[n]) \triangleq d[n]\ \mu^{-1}(s_k[n]) \triangleq d_k[n]\ \mu_j^{-1}(s_k[n]) \triangleq d_{k,j}[n]$$

Figure 3:
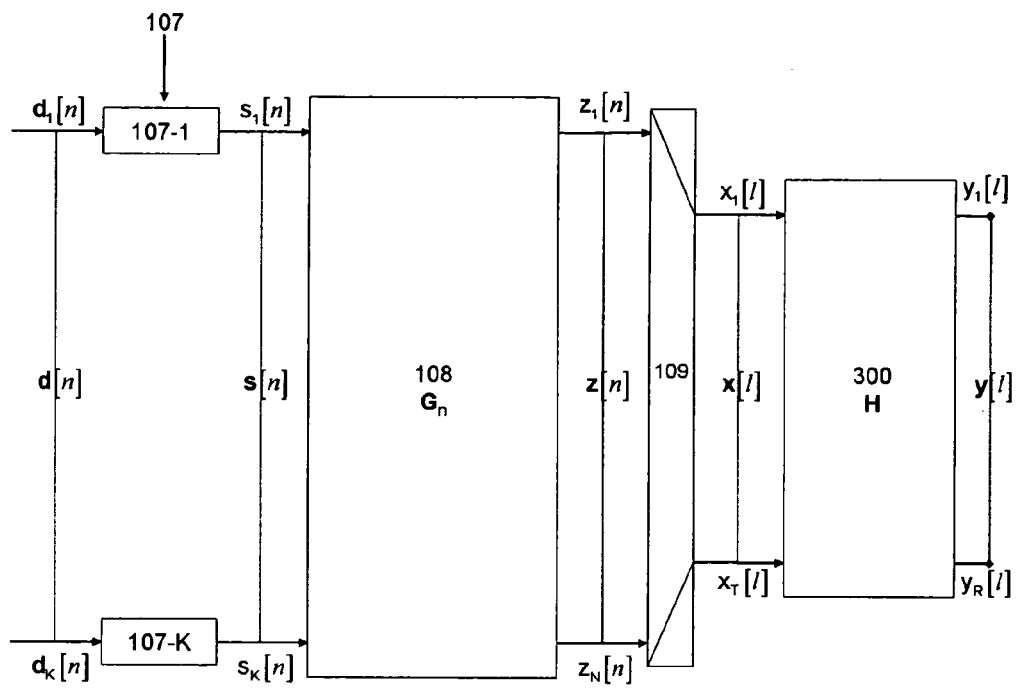
FIG. 3 shows the second part of the FIG. 2 sending process, including space-time (space-frequency) spreading followed by multiplexing onto T send antennas.

1.1 Space-Time (or Space-Frequency) Internal Linear Coding (or Spreading) under Overload Conditions Referring to FIG. 3, space-time (or space-frequency) spreading 108 is effected for each matrix S by means of an N×K generator full matrix G (generator matrix of the internal linear coding defined on the body of the complexes), where:

$$N = T \times S_F \; S_F \in \mathbb{Z}$$

This generator matrix is also called a spreading matrix. For example, this matrix may be considered to be constructed from N orthogonal spreading codes with spreading factor N. This internal linear coding therefore corresponds, in this case, to space-time (space-frequency) spreading with spreading factor N. The internal coding yield (or load) of the system is the ratio:

$$\alpha = \frac{K}{N}$$

Two options are always available with respect to the definition of the generator matrix G: periodic spreading 108 in which G is re-used in each symbol time (not shown), or aperiodic spreading 108 in which G depends explicitly on the symbol time (see FIG. 3).

The hypothesis of periodic or aperiodic spreading can change the characteristics of the linear front-ends on reception.

Here aperiodic spreading is assumed (this is the most general case).

Referring to FIG. 3, the multiplication at 108 of the symbol vectors s[n] by the generator matrix $G_n$ produces a vector of N chips:

$$z[n] \triangleq G_n s[n] = [z_1[n] \; z_2[n] \ldots z_N[n]]^T \in \mathbb{C}^N$$

The chip vectors z[n] are directly multiplexed at 109 onto the T send antennas (there is no posterior chip interleaving here). The effect of this operation is to transform the N×L chip matrix Z:

$$Z = [z[0] \; z[1] \ldots z[L-1]] \in \mathbb{C}^{N \times L}$$

into a T×$LS_F$ chip matrix X:

$$X = [x[0] \; x[1] \ldots x[LS_F - 1]] \in \mathbb{C}^{T \times LS_F}$$

in which the columns x[l] l=0, . . . , $LS_F$−1 constitute the inputs of the MIMO channel:

$$x[l] = [x_1[l] \; x_2[l] \ldots x_T[l]]^T \in \mathbb{C}^T$$

The vector z[n] of the N chips sent at the symbolic time n can always be organized in the form of a chip vector $\underline{x}[n]$ resulting from the juxtaposition of the chip vectors sent over the T antennas between the chip times $l=nS_F$ and $l=nS_F+S_F-1$:

$$\underline{x}[n] \triangleq [x[nS_F+S_F-1]^T \ldots x[nS_F+1]^T \; x[nS_F+0]^T]^T \in \mathbb{C}^{TS_F}$$

Accordingly, as a general rule, the vectors $\underline{x}[n]$ z[n] and s[n] sent at the symbolic time n=0, . . . , L−1 are linked by the matrix equations:

$$\underline{x}[n] \triangleq \Pi z[n] = \Pi G_n s[n] = W_n s[n]$$

in which Π designates an N×N permutation matrix.

1.2 Special Case: Independent Spreading per Send Antenna (Code Re-Use Principle)

By hypothesis, N is here a multiple of T:

$$N = T \times S_F \; S_F \in \mathbb{Z}$$

There are $S_F$ orthogonal codes of length $S_F$. These $S_F$ codes are re-used at each send antenna (this is the code re-use principle). The spreading, effected independently for each antenna, is purely in the time domain (or the frequency domain). This imposes that K be also a multiple of T:

$$K = T \times U \; U \in \mathbb{Z}$$

This condition yields a new expression for the internal coding yield (load):

$$\alpha = \frac{U}{S_F}$$

The generator matrix $G_n$ has a block diagonal structure:

$$G_n = \begin{bmatrix} G_n^{(1)} & & & 0 \\ & G_n^{(2)} & & \\ & & \ddots & \\ 0 & & & G_n^{(T)} \end{bmatrix} \in \mathbb{C}^{N \times K}$$

the block $G_n^{(t)}$ of the generator matrix being associated with the antenna t with dimension $S_F \times U$.

Figure 4:
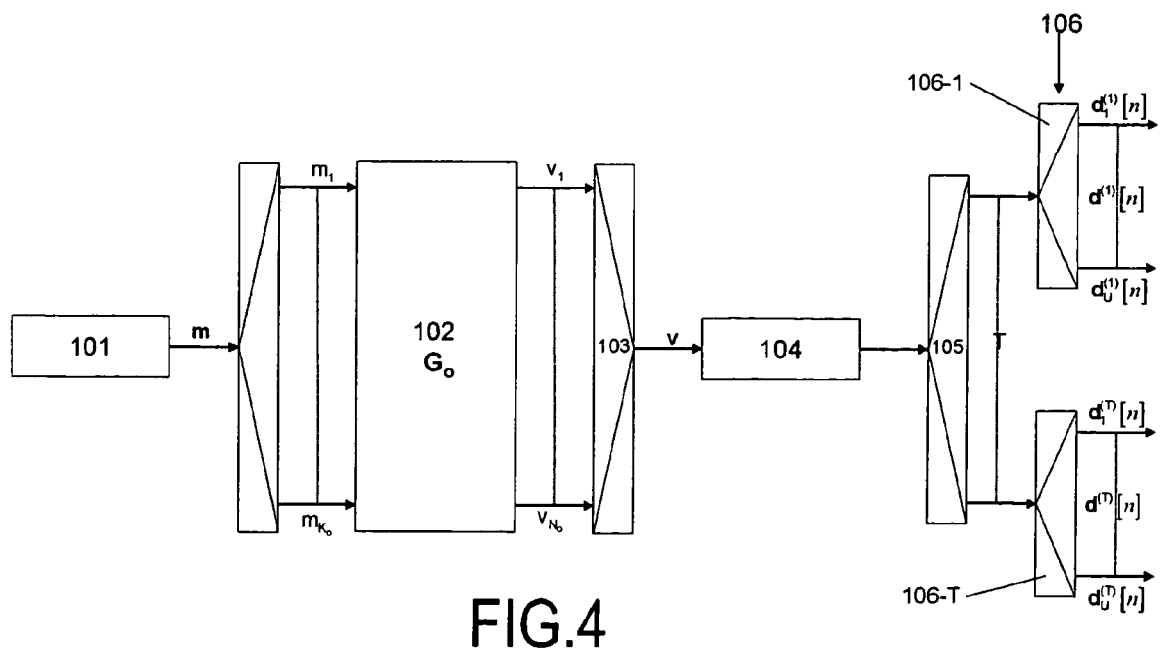
FIG. 4 shows a first part of a variant sending process including external channel coding of digital information, bit interleaving, first demultiplexing (space demultiplexing) into T streams followed by second demultiplexing (code demultiplexing) into U streams.

Referring to FIG. 4, the integer vector d[n] sent at the time n has the following particular structure:

$$d[n] = [d^{(1)}[n]^T \; d^{(2)}[n]^T \ldots d^{(T)}[n]^T]^T \in F_2^{qK}$$

in which the symbol vectors $d^{(t)}[n]$ t=1, . . . , T are themselves defined as follows:

$$d^{(t)}[n] = [d_1^{(t)}[n]^T \; d_2^{(t)}[n]^T \ldots d_U^{(t)}[n]^T]^T \in F_2^{qU}$$

Figure 5:
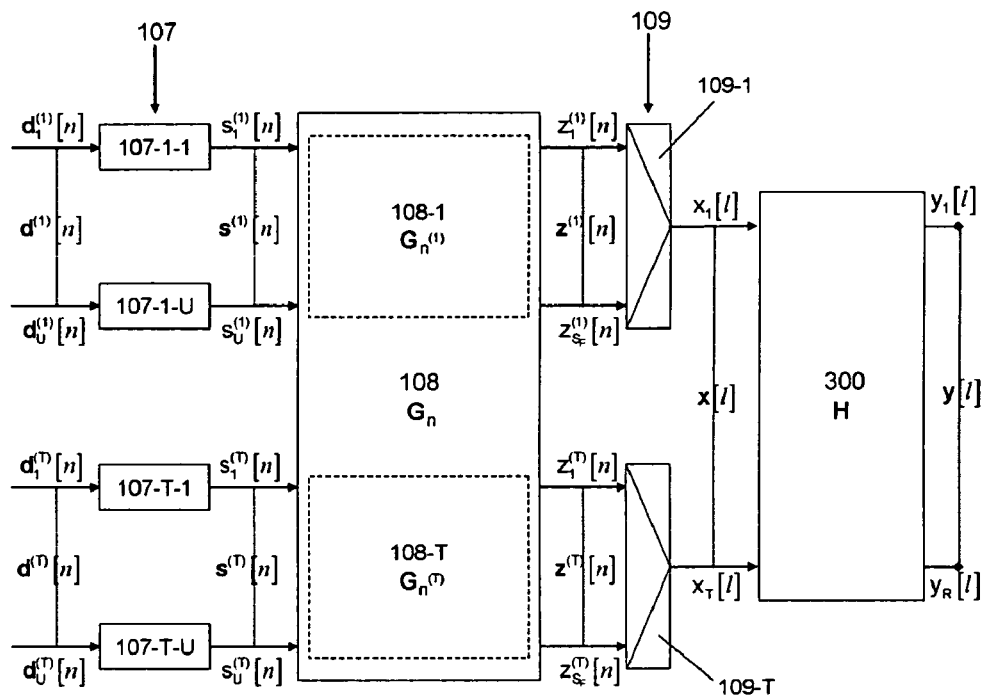
FIG. 5 shows the second part of the FIG. 4 sending process, including time (or frequency) spreading and independent multiplexing for each antenna, compatible with the UMTS HSDPA mode.

Referring to FIG. 5, the modulation 107 of this data d[n] yields a modulated data (or symbols) vector sent at the time n having the following particular structure:

$$s[n] = [s^{(1)}[n]^T \; s^{(2)}[n]^T \ldots s^{(T)}[n]^T]^T \in \mathbb{C}^K$$

in which the symbol vectors $s^{(t)}[n]$ t=1, . . . , T are themselves defined as follows:

$$s^{(t)}[n] = [s_1^{(t)}[n] \; s_2^{(t)}[n] \ldots s_U^{(t)}[n]]^T \in \mathbb{C}^U$$

The multiplication 108 of the K-dimensional symbol vector s[n] by the generator matrix $G_n$ produces a vector of N chips, which also has a particular structure:

$$z[n] \triangleq G_n s[n] = [z^{(1)}[n]^T \; z^{(2)}[n]^T \ldots z^{(T)}[n]^T]^T \in \mathbb{C}^N$$

in which the chip vectors $z^{(t)}[n]$ t=1, . . . , T are themselves defined as follows:

$$z^{(t)}[n] \triangleq G_n^{(t)} s^{(t)}[n] = [z_1^{(t)}[n] \; z_2^{(t)}[n] \ldots z_{S_F}^{(t)}[n]]^T \in \mathbb{C}^{S_F}$$

Each chip vector $z^{(t)}[n]$ is then multiplexed onto the send antenna t.

The vector z[n] of the N chips sent at the symbolic time can always be organized in the form of a chip vector $\underline{x}[n]$ resulting from the juxtaposition of the chip vectors sent over the T antennas between the chip times $l=nS_F$ and $l=nS_F+S_F-1$:

$$\underline{x}[n] \triangleq [x[nS_F+S_F-1]^T \ldots x[nS_F+1]^T \; x[nS_F+0]^T]^T \in \mathbb{C}^{TS_F}$$

Accordingly, as a general rule, the vectors $\underline{x}[n]$ z[n] and s[n] sent at the symbolic time n=0, . . . , L−1 are linked by the matrix equations:

$$\underline{x}[n] \triangleq \Pi z[n] = \Pi G_n s[n] = W_n s[n]$$

in which Π designates an N×N permutation matrix.

It will be noted that in this sending variant, the recovery of the spatial diversity is effected via the code $G_0$ (at 102) and the external bit interleaving (at 104). The overload capacity, which is known to increase with the length of the spreading codes, is lower.

The sending method fits naturally into the general class of space-time codes. The spectral efficiency of the system (in bits per use of the channel), assuming a limited band ideal Nyquist filter, is equal to:

$$\eta = T \times \rho_O \times q \times \alpha$$

In practice, the send shaping filter has a non-null overflow factor (roll-off) $\epsilon$. At the receiver, a filter matched to this send filter is used for all the receive antennas. It is assumed that the channel estimation and timing and carrier synchronization functions are implemented so that the coefficients of the impulse response of the channel are regularly spaced by an amount equal to the chip time (channel equivalent in the discrete baseband to the discrete time). This hypothesis is legitimate, the Shannon sampling theorem imposing sampling at the rate $(1+\epsilon)/T_c$ which may be approximated by $1/T_c$ when $\epsilon$ is small. Direct generalization is possible for expressions given below for a sampling rate equal to a multiple of $1/T_c$.

2. Channel Model

Transmission is effected on a frequency-selective B-block channel with multiple inputs and outputs (MIMO):

$$H \triangleq \{H^{(1)}, H^{(2)}, \ldots, H^{(B)}\}$$

The channel $H^{(b)}$ is assumed constant over $L_x$ chips with the convention:

$$L \times S_F = B \times L_X B \in \mathbb{Z}$$

The chip matrix X may be segmented into B separate $T \times L_X$ chip matrices $X^{(1)}, \ldots, X^{(B)}$ (padded on the right and left with physical zeros or guard times if necessary), each matrix $X^{(b)}$ seeing the channel $H^{(b)}$. For what follows, it is useful to introduce a length of the blocks in symbols, defined as:

$$L_S \triangleq \left\lceil \frac{L_X}{S_F} \right\rceil$$

such that:

$$L = B \times L_S$$

The extreme cases of the B-block model are as follows:

B=1 and $L_X = L S_F \rightarrow L_S = L$ quasi-static model

B=$LS_F$ and $L_X = 1 \rightarrow L_S = 1$ ergodic (chip) model

A renumbering of the symbols and the chips is applied within each block.

2.1 Convolutional Channel Model

For any block index b, the discrete time baseband equivalent channel model (chip timing) is used to write the receive vector $y^{(b)}[l] \in \mathbb{C}^R$ at the chip time 1 in the form:

$$y^{(b)}[l] = \sum_{p=0}^{P-1} H_p^{(b)} x^{(b)}[l-p] + v^{(b)}[l]$$

where P is the constraint length of the channel (in chips), $x^{(b)}[l] \in \mathbb{C}^T$ is the complex vector of T chips sent at the chip time 1, where $H_p^{(b)} \in \mathbb{C}^{R \times T}$ is the matrix coefficient indexed p of the impulse response of the block MIMO channel indexed b and $v^{(b)}[l] \in \mathbb{C}^R$ is the complex additive noise vector. The complex additive noise vectors $v^{(b)}[l]$ are assumed to be independent and identically distributed in accordance with an R-dimensional Gaussian law of circular symmetry with zero mean and covariance matrix $\sigma^2 I$. The P coefficients of the impulse response are R×T complex matrices, the inputs of which are identically distributed independent Gaussian inputs, with zero mean and with a covariance matrix satisfying the global power normalization constraint:

$$E\left[\text{diag}\left\{\sum_{p=0}^{P-1} H_p^{(b)} H_p^{(b)\dagger}\right\}\right] = TI$$

in the case of a system with power equally distributed between the send antennas. Given these hypotheses, the eigen values of the correlation matrices of the coefficients of the MIMO channel conform to a Wishart distribution. It is emphasized that equal distribution of the power to the send antennas is a legitimate power allocation policy in the case of an absence of knowledge of the sending channel (no CSI).

2.2 Block Matrix Channel Model

To introduce the data decoding algorithm, one must show a matrix system on the set of the type:

$$\underline{y}^{(b)} = \underline{\underline{H}}^{(b)} \underline{x}^{(b)} + \underline{v}^{(b)}$$

where:

$$\underline{y}^{(b)} \triangleq [y^{(b)}[L_S-1+M]^T \, y^{(b)}[L_S-2+M]^T \ldots y^{(b)}[0]^T]^T \in \mathbb{C}^{(L_S+M)RS_F}$$

$$\underline{v}^{(b)} \triangleq [v^{(b)}[L_S-1+M]^T \, v^{(b)}[L_S-2+M]^T \ldots v^{(b)}[0]^T]^T \in \mathbb{C}^{(L_S+M)RS_F}$$

where M is the memory of the channel in symbol times defined as:

$$M = \left\lceil \frac{P-1}{S_F} \right\rceil \text{ with:}$$

$$\underline{y}^{(b)}[n] \triangleq \left[y^{(b)}[nS_F + S_F - 1]^T \cdots y^{(b)}[nS_F + 1]^T \, y^{(b)}[nS_F + 0]^T\right]^T \in \mathbb{C}^{RS_F}$$

$$\underline{v}^{(b)}[n] \triangleq \left[v^{(b)}[nS_F + S_F - 1]^T \cdots v^{(b)}[nS_F + 1]^T \, v^{(b)}[nS_F + 0]^T\right]^T \in \mathbb{C}^{RS_F}$$

where:

$$\underline{x}^{(b)} \triangleq \left[x^{(b)}[L_S - 1]^T \, x^{(b)}[L_S - 2]^T \cdots x^{(b)}[0]^T\right]^T \in \mathbb{C}^{L_S T S_F} \text{ with:}$$

$$\underline{x}^{(b)}[n] \triangleq \left[x^{(b)}[nS_F + S_F - 1]^T \cdots x^{(b)}[nS_F + 1]^T \, x^{(b)}[nS_F + 0]^T\right]^T \in \mathbb{C}^{T S_F}$$

and where $\underline{\underline{H}}^{(b)}$ is the Sylvester matrix for the channel:

$$\underline{\underline{H}}^{(b)} = \begin{bmatrix} H^{(b)}_{P-1} & & & & & & \\ H^{(b)}_{P-2} & H^{(b)}_{P-1} & & & & & \\ & \ddots & & & & & \\ H^{(b)}_0 & H^{(b)}_1 & \cdots & H^{(b)}_{P-1} & & & \\ & H^{(b)}_0 & H^{(b)}_1 & \cdots & H^{(b)}_{P-1} & & \\ & & \ddots & \ddots & \ddots & \ddots & \\ & & & H^{(b)}_0 & H^{(b)}_1 & \cdots & H^{(b)}_{P-1} \\ & & & & \ddots & & \\ & & & & & H^{(b)}_0 & H^{(b)}_1 \\ & & & & & & H^{(b)}_0 \end{bmatrix} \in \mathbb{C}^{(L_S+M)RS_F \times L_S TS_F}$$

Moreover:

$$\underline{x}^{(b)} = \begin{bmatrix} \underline{x}^{(b)}[L_S-1] \\ \underline{x}^{(b)}[L_S-2] \\ \vdots \\ \underline{x}^{(b)}[0] \end{bmatrix} = \begin{bmatrix} W_{L-1} & & & \\ & W_{L-2} & & \\ & & \ddots & \\ & & & W_0 \end{bmatrix} \begin{bmatrix} \underline{s}^{(b)}[L_S-1] \\ \underline{s}^{(b)}[L_S-2] \\ \vdots \\ \underline{s}^{(b)}[0] \end{bmatrix} = \underline{\underline{W}} \underline{s}^{(b)}$$

$W_n$ (n=0, ..., L−1) having been introduced above from the spreading matrix $G_n$ during the description of preferred sending forms (end of sections 1.1 and 1.2).

Whence, finally, the system:

$$\underline{y}^{(b)} = \underline{\underline{H}}^{(b)} \underline{\underline{W}} \underline{s}^{(b)} + \underline{v}^{(b)} = \underline{\underline{\Theta}}^{(b)} \underline{s}^{(b)} + \underline{v}^{(b)}$$

where $\underline{\underline{\Theta}}^{(b)}$ represents the matrix of convolution of the channel with the spreading codes:

$$\underline{\underline{\Theta}}^{(b)} \triangleq \underline{\underline{H}}^{(b)} \underline{\underline{W}} \in \mathbb{C}^{(L_S+M)RS_F \times L_S K}$$

2.3 Sliding Window Matrix Channel Model

In practice, to reduce the dimensions, a sliding window model is used of length:

$$L_W = L_1 + L_2 + 1 \ll L_S$$

The following new system is obtained:

$$\underline{y}^{(b)}[n] = \underline{\underline{H}}^{(b)} \underline{x}^{(b)}[n] + \underline{v}^{(b)}[n]$$

where:

$$\underline{y}^{(b)}[n] = [\underline{y}^{(b)}[n+L_1]^T \ldots \underline{y}^{(b)}[n-L_2]^T]^T \in \mathbb{C}^{L_W RS_F}$$

$$\underline{x}^{(b)}[n] = [\underline{x}^{(b)}[n+L_1]^T \ldots \underline{x}^{(b)}[n-L_2-M]^T]^T \in \mathbb{C}^{(L_W+M)TS_F}$$

$$\underline{v}^{(b)}[n] = [\underline{v}^{(b)}[n+L_1]^T \ldots \underline{v}^{(b)}[n-L_2]^T]^T \in \mathbb{C}^{L_W RS_F}$$

and where $\underline{\underline{H}}^{(b)}$ is the Sylvester matrix for the channel:

$$\underline{\underline{H}}^{(b)} = \begin{bmatrix} H^{(b)}_0 & H^{(b)}_1 & \cdots & H^{(b)}_{P-1} & & \\ & H^{(b)}_0 & H^{(b)}_1 & \cdots & H^{(b)}_{P-1} & \\ & & \ddots & \ddots & \ddots & \ddots \\ & & & H^{(b)}_0 & H^{(b)}_1 & \cdots & H^{(b)}_{P-1} \end{bmatrix} \in \mathbb{C}^{L_W RS_F \times (L_W+M)TS_F}$$

Moreover:

$$\underline{x}^{(b)}[n] = \begin{bmatrix} \underline{x}^{(b)}[n+L_1] \\ \vdots \\ \underline{x}^{(b)}[n-L_2-M] \end{bmatrix}$$

$$= \begin{bmatrix} W_{n+L_1} & & \\ & \ddots & \\ & & W_{n-L_2-M} \end{bmatrix} \begin{bmatrix} \underline{s}^{(b)}[n+L_1] \\ \vdots \\ \underline{s}^{(b)}[n-L_2-M] \end{bmatrix}$$

$$= \underline{\underline{W}}_n \underline{s}^{(b)}[n]$$

Whence, finally, the system:

$$\underline{y}^{(b)}[n] = \underline{\underline{H}}^{(b)} \underline{\underline{W}}_n \underline{s}^{(b)}[n] + \underline{v}^{(b)}[n] = \underline{\underline{\Theta}}_n^{(b)} \underline{s}^{(b)}[n] + \underline{v}^{(b)}[n]$$

where $\underline{\underline{\Theta}}_n^{(b)}$ represents the matrix of convolution of the channel with the spreading codes:

$$\underline{\underline{\Theta}}_n^{(b)} \triangleq \underline{\underline{H}}^{(b)} \underline{\underline{W}}_n \in \mathbb{C}^{L_W RS_F \times (L_W+M)K}$$

3. Multipath MIMO Channel Single-Carrier Transmission (HSDPA)

It is assumed here that the bit rate is very high and that the coherence time of the channel is long, so that $L_X \gg S_F \rightarrow L_S \gg 1$. For the HSDPA mode of the UMTS standard, the channel is quasi-static, i.e. B=1.

4. Multipath MIMO Channel Multicarrier Transmission (MC-CDMA)

Figure 6:
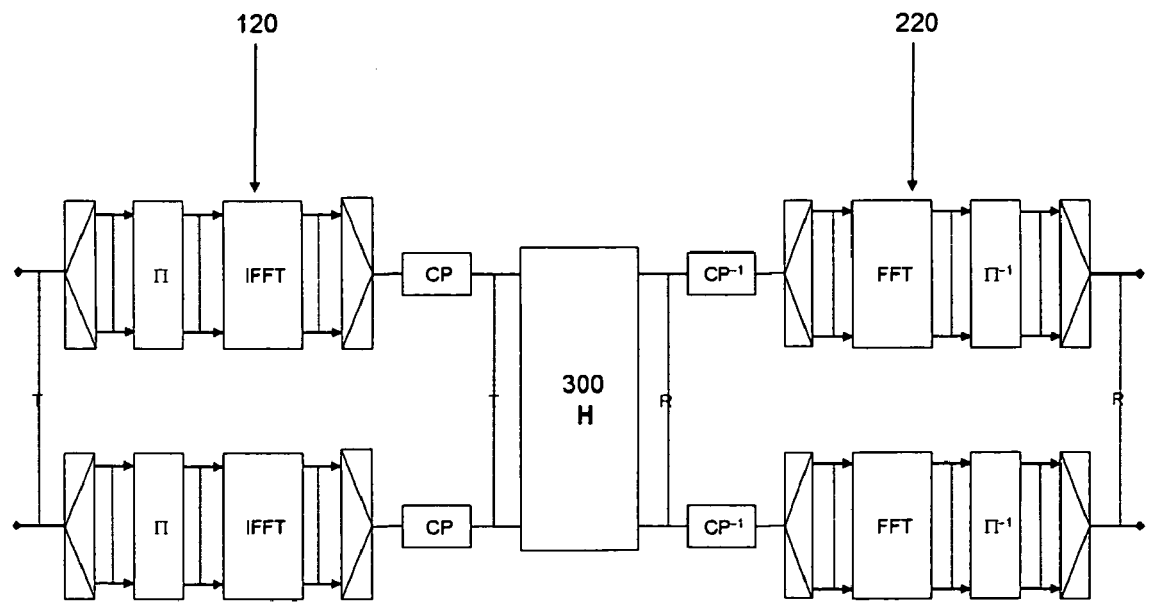
FIG. 6 shows a flat ergodic or block level fading equivalent channel obtained by decomposition of the frequency-selective MIMO channel into the Fourier base and routinely used as a model for multicarrier modulations.

The spreading (or the internal linear code) is space-frequency spreading or frequency spreading. With reference to FIG. 6, it is well known to the person skilled in the art that the introduction of a send IFFT 120 and a receive FFT 220 yields (ignoring interleaving) an equivalent channel that is not frequency selective (channel modeled by a circulating matrix using cyclic prefixes, then rendered diagonal in the Fourier base). Accordingly, each carrier sees a flat MIMO channel. Using the formalism previously described, the channel after FFT may be seen as a non-selective B-block channel (P=1, M=0). It is specified that $L_X \leq S_F \rightarrow L_S = 1$: the channel is a B-block channel at the chip time but everything happens as if it were "ergodic" at the symbol time for the symbolic model considered. The width of the sliding window for calculating the filters is $L_W=1$.

5. General Structure of the Receiver 200

The receiver 200 uses LIC-ID detection. Two types of linear front end are derived by way of example: non-conditional MMSE and SUMF. In the remainder of the description the definition of the index b of the block concerned of the channel model is omitted, the processing being exactly the same for all of them.

5.1 Sent K-Dimensional Symbol MMSE estimation

On any iteration i, there is assumed an a priori knowledge of the data expressed via logarithmic ratios on the bits of the sent symbols:

$$\pi_{k,j}^i[n] \triangleq \ln\frac{Pr^i[d_{k,j}[n]=1]}{Pr^i[d_{k,j}[n]=0]}$$

By convention, these ratios have the value 0 on the first iteration.

Figure 7:
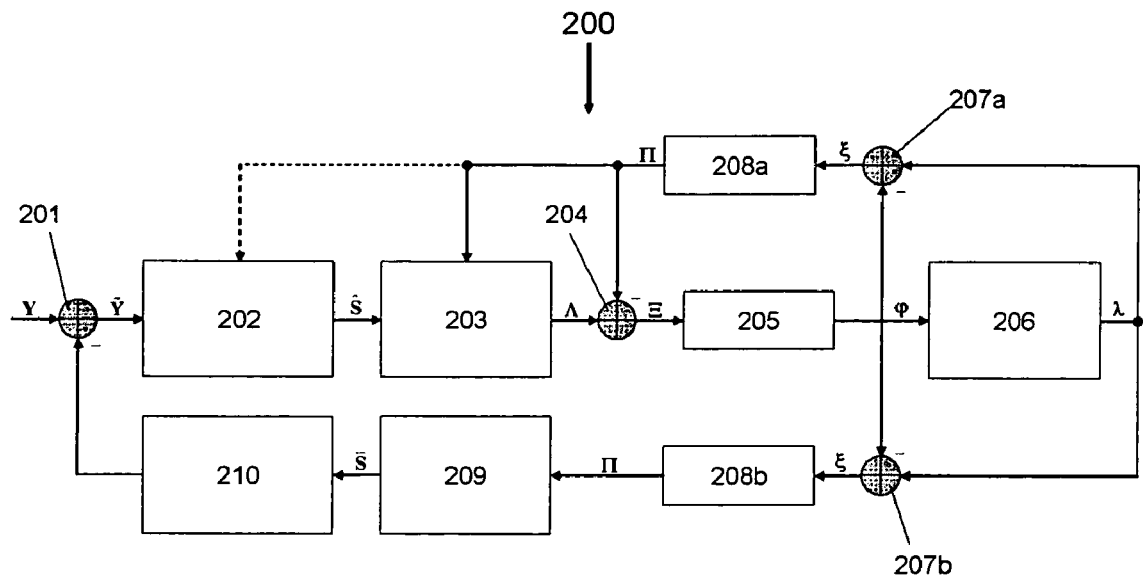
FIG. 7 shows the architecture of an LIC-ID receiver of the invention, indicating only the functional units necessary to understand the receiving process.

Referring to FIG. 7, on the basis of this a priori information, there can be found at 209 the value $\bar{s}^i$ of the estimates, in the sense of the MMSE criterion, of the L K-dimensional symbols $s_k[n]$ at the times n=0, ..., L−1. The estimate of a K-dimensional symbol is expressed as follows:

$$\bar{s}_k^i[n] \triangleq \sum_{s\in\mathcal{V}} s \times Pr^i[s_k[n]=s]$$

With deep space-time interleaving, the a priori probability for a symbol may be approximated by the product of the marginal probabilities of the bits that constitute it:

$$Pr^i[s[n]=s] \approx \prod_{k=1}^{K}\prod_{j=1}^{q} Pr^i[d_{k,j}[n]=\mu_{k,j}^{-1}(s)]$$

equality being obtained for an infinite interleaving depth.

To introduce the logarithmic ratio $\pi_{k,j}^i[n]$ of the bit a priori probabilities previously defined, we may write:

$$Pr^i[s[n]=s] = \frac{1}{2^{qK}}\prod_{k=1}^{K}\prod_{j=1}^{q}\left\{1+(2\mu_{k,j}^{-1}(s)-1)\tanh\left(\frac{\pi_{k,j}^i[n]}{2}\right)\right\}$$

and finally find:

$$\bar{s}^i[n] \triangleq \frac{1}{2^{qK}}\sum_{s\in\mathcal{V}^K}s\times\prod_{k=1}^{K}\prod_{j=1}^{q}\left\{1+(2\mu_{k,j}^{-1}(s)-1)\tanh\left(\frac{\pi_{k,j}^i[n]}{2}\right)\right\}$$

5.2 Unconditional MMSE Vectorial Equalization

The invention suggests replacing the optimum detection of the K-dimensional symbols $s_k[n]$ in the sense of the MAP criterion by an estimate in the sense of the (biased) MMSE criterion derived on the basis of the sliding window model, the complexity whereof is polynomial in terms of the parameters of the system, and no longer exponential.

On each iteration i, there is calculated at 202 the filter $F_n^i \in \mathbb{C}^{K\times L_W R S_F}$ which, on the basis of an updated observation (relating to a portion of the block of the particular channel) eliminates the ISI corrupting the K-dimensional symbol $s_k[n]$ and produces an evaluation $\hat{s}[n]$ of the modulated data (or symbols) sent that minimizes the mean square error (MSE):

$$E[\|\hat{s}[n]-s[n]\|^2] = tr\, E[(\hat{s}[n]-s[n])(\hat{s}[n]-s[n])^\dagger]$$

On the basis of the vector of the estimates of the K-dimensional symbols on the iteration i:

$$\bar{\underline{s}}^i[n] = [\bar{s}^i[n+L_1]^T \ldots \bar{s}^i[n]^T \ldots \\ s^i[n-L_2-M]^T]^T \in \mathbb{C}^{(L_W+M)K}$$

there is defined at 210 the modified version, including a 0 at position $L_1+1$, which serves for the regeneration of the interface for the K-dimensional symbol $s[n]$:

$$\bar{\underline{s}}_\Delta^i[n] = [\bar{s}^i[n+L_1]^T \ldots \bar{s}^i[n+1]^T\, 0^T\, \bar{s}^i[n-1]^T \ldots \\ \bar{s}^i[n-L_2-M]^T]^T \in \mathbb{C}^{(L_W+M)K}$$

An interference estimate is therefore regenerated at 210, by multiplying this vector by said "matrix of convolution of the channel with the spreading codes" $\underline{\Theta}_n$ (computed in section 2.2 or 2.3):

$$\underline{\Theta}_n \bar{\underline{s}}_\Delta^i[n]$$

The Wiener filter is applied at 202 to the observation vector obtained after subtraction at 201 of the interference regenerated at 210:

$$\underline{\tilde{y}}^i[n] = \underline{y}[n] - \underline{\Theta}_n \bar{\underline{s}}_\Delta^i[n]$$

For obvious reasons of complexity, an unconditional MSE and periodic spreading are used such that:

$$\underline{\Theta}_n = \underline{\Theta} \;\forall n=0,\ldots,L_S-1$$

This makes the filter $F^i$ invariant in time for the block considered of the particular channel.

It is preferable not to use this MMSE estimate, in favor of a simpler linear front end (polynomial or SUMF, as described in the next section) if the spreading is aperiodic.

This filter minimizes the unconditional MSE on the (biased) estimate of the K-dimensional symbol $s_k[n]$ and may easily be derived from the theory of orthogonal projection:

$$F^i = E_\Delta \underline{\Theta}^\dagger [\underline{\Theta}\,\underline{\Xi}_\Delta^i\,\underline{\Theta}^\dagger + \sigma^2 I]^{-1}$$

where $E_\Delta$ is the matrix with dimensions $K\times(L_W+M)K$ structured as follows:

$$E_\Delta = [\underbrace{0\;\cdots\;0}_{L_1}\; I\; \underbrace{0\;\cdots\;0}_{L_2+M}] \in \mathbb{C}^{K\times(L_F+M)K}$$

and where:

$$\underline{\Xi} \triangleq E\{(\underline{s}[n]-\bar{\underline{s}}_\Delta^i[n])(\underline{s}[n]-\bar{\underline{s}}_\Delta^i[n])^\dagger\} \in \mathbb{C}^{(L_W+M)K\times(L_W+M)K}$$

$$\underline{\Xi}_\Delta^i = \mathrm{diag}\{(\sigma_s^2-\sigma_{\bar{s}}^{i2})I,\ldots,(\sigma_s^2-\sigma_{\bar{s}}^{i2})I,\sigma_s^2 I,(\sigma_s^2-\sigma_{\bar{s}}^{i2})I,\ldots,(\sigma_s^2-\sigma_{\bar{s}}^{i2})I\}$$

with the term $\sigma_s^2 I$ situated at the position $L_1+1$ on the diagonal and $\sigma_{\bar{s}}^{i2}$ evaluated using the estimator consisting in:

$$\sigma_s^{i2} \approx \hat{\sigma}_s^{i2} \triangleq \frac{1}{KL_S} \sum_{k=1}^{K} \sum_{n=0}^{L_S-1} |s_k^i[n]|^2$$

The evaluated $\hat{s}^i$ is given by the output of the filter 202:

$$\hat{s}^i[n] \triangleq F^i \underline{y}^i[n] = \Psi_0^i s[n] + \zeta^i[n]$$

where:

$$\Psi_0^i = F^i \underline{\Theta} E_\Delta^\dagger$$

and where $\zeta^i[n]$ is the residual interference and covariance matrix noise vector:

$$\Xi_\zeta^i = \sigma_s^2 (1 - \Psi_0^i) \Psi_0^{i\dagger}$$

The K-dimensional residual interference and noise vector $\zeta^i[n]$ may be whitened by Cholesky decomposition.

$$\Xi_\zeta^i = LL^\dagger$$

5.3 SUMF Vectorial Equalization

The MMSE approach previously described may prove too complex (for aperiodic spreading for example). There may be preferred over it the Single User Matched Filter vectorial filter, for all iterations starting from a certain iteration i. This is expressed for any time n as follows:

$$F_n^{i=E} \underline{\Theta}_n^\dagger$$

Figure 8A:
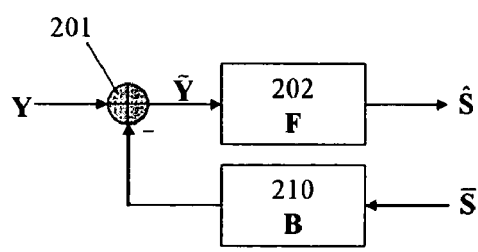
FIGS. 8a and 8b show two equivalent methods of implementing LIC-ID receivers, the FIG. 8a method representing the interference regeneration and filtering parts of the overall detector shown in FIG. 7.
Figure 8B:
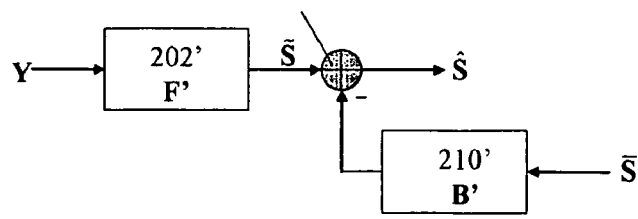

Other Possible Equalization Variant:

FIG. 8b represents a variant of either of the detection types described in sections 5.2 and 5.3. This variant relates to a different way of implementing the filter 202' and the interference regenerator 210' compared to the filter 202 and the interference regenerator 210 of FIG. 8a (representing two detection steps corresponding to a portion of the overall detection process shown in the FIG. 7 diagram).

Referring to FIG. 8b, the filtering 202' is here effected upstream of the subtraction of regenerated interference 201 at 210', and not downstream thereof as was the case in FIG. 8a.

The filter F' used and the interference reconstruction matrix B' used may be deduced trivially from the filter F and the interference reconstruction matrix B previously computed (see above description with reference to FIGS. 7 and 8a), from the following condition of equality:

$$\hat{S} = F(Y - B\overline{S}) = F'Y - B'\overline{S}$$

From which we deduce:

$$F' = F; \quad B' = FB$$

5.4 Detection of the Binary Components of the K-Dimensional Symbols

By applying the filter $L^{-1}F^i$, the following equivalent model is produced:

$$\hat{s}^i[n] = L^{-1} \Psi_0^i s[n] + \zeta^i[n]$$

in which the vector $\zeta^i[n]$ is of identity covariance matrix.

Vectorial detection is used to calculate at 203 logarithmic ratios of the a posteriori probabilities on each bit of each K-dimensional symbol sent at each time. These probabilistic quantities are defined as follows, in accordance with a maximum a posteriori (MAP) criterion:

$$\lambda_{k,j}^i[n] \triangleq \ln \frac{Pr[d_{k,j}[n] = 1 | \hat{s}^i[n]]}{Pr[d_{k,j}[n] = 0 | \hat{s}^i[n]]}$$

and are referenced Λ in FIG. 7;

or:

$$\lambda_{k,j}^i[n] = \ln \frac{\sum_{d \in \aleph_{k,j}^{(1)}} Pr[d[n] = d | \hat{s}^i[n]]}{\sum_{d \in \aleph_{k,j}^{(0)}} Pr[d[n] = d | \hat{s}^i[n]]}$$

in which we introduce:

$$\aleph_{k,j}^{(\varepsilon)} = \{ d \in F_2^{qK} | d_{k,j} = \varepsilon \} \quad \text{or:}$$

$$\lambda_{k,j}^i[n] = \ln \frac{\sum_{d \in \aleph_j^{(1)}} p(\hat{s}^i[n] | s[n] = \mu(d)) Pr^i[d[n] = d]}{\sum_{d \in \aleph_j^{(0)}} p(\hat{s}^i[n] | s[n] = \mu(d)) Pr^i[d[n] = d]}$$

with $$Pr^i[d[n] = d] = \prod_{k=1}^{K} \prod_{j=1}^{q} Pr^i[d_{k,j}[n] = d_{k,j}]$$

obtained from the $\pi_{k,j}^i[n]$ (see section 5.1).

As for the likelihoods, they are expressed as follows:

$$p(\hat{s}^i[n] | s[n] = \mu(d)) \propto \exp(-(\hat{s}^i[n] - L^{-1} \Psi_0^i \mu(d))^\dagger \cdot (\hat{s}^i[n] - L^{-1} \Psi_0^i \mu(d)))$$

Variant 1:

Here the vectorial processing 203 in accordance with a MAP criterion is replaced by vectorial processing 203 using a sphere decoding algorithm with lists, the complexity of which is lower since polynomial in K (and not exponential in K, as is the MAP criterion).

Variant 2:

Here, the vectorial processing 203 is iterative linear cancellation derived from an MMSE criterion or from a criterion of maximizing a signal-to-noise ratio (MAX SNR) performed by matched filters (SUMF).

Variant 3:

The vectorial processing 203 here comprises the successive implementation of a plurality of different vectorial processing operations from given iteration(s), each of these vectorial processing operations being one of those discussed above in this section. For example, "MAP" processing is executed up to the iteration i, then "sphere with lists" processing up to the iteration i+M, then "MMSE" processing.

This $3^{rd}$ variant is rendered possible thanks to an additional degree of freedom that is available for effecting a vectorial detection at a given iteration i.

5.5 Exchange of Probabilistic Information with the Channel Decoder 206

On each iteration i, a priori information on the bits of the various symbols coming from the channel decoder 206 is available and usable in the form of logarithmic APP ratios introduced beforehand and the expression for which is:

$$\pi_{k,j}^i[n] \triangleq \ln \frac{Pr^i[d_{k,j}[n] = 1]}{Pr^i[d_{k,j}[n] = 0]}$$

The extrinsic information on each bit delivered by vectorial detection weighted output demodulators 203 intended for the channel decoder 206 is delivered by a weighted output demodulator 203 in the following form:

$$\xi_{k,j}^i[n] \triangleq \lambda_{k,j}^i[n] - \pi_{k,j}^i[n]$$

It is denoted Ξ in FIG. 7.

All the bit extrinsic information logarithmic ratios for all the blocks are then collected and properly multiplexed and de-interleaved at 205, to be sent to the channel decoder 206. The decoder sees a unique vector $\phi^i \in \mathbb{R}^{N_o}$ made up of $N_o$ bit intrinsic probability logarithmic ratios (one for each bit of the code word v). Decoding 206 then uses an algorithm such as the flexible output Viterbi algorithm to deliver the logarithm λ of a ratio of information APP to sent modulated data (or symbols) bits.

This logarithm λ is then the basis on which are computed at 207a and 207b the bit extrinsic information logarithmic ratios after decoding, formally defined ∀l=1, . . . , $N_o$ as follows:

$$\xi_l^i \triangleq \ln \frac{Pr^i[v_l = 1 \mid C_o, \varphi^i / \{\varphi_l^i\}]}{Pr^i[v_l = 0 \mid C_o, \varphi^i / \{\varphi_l^i\}]}$$

The code word extrinsic information logarithmic ratios $\{\xi_l^i\}$ calculated in the iteration i are similar, after bit interleaving and demultiplexing 208a and 208b, to the symbol bit APP logarithmic ratios $\{\pi_{k,j}^{i+1}[n]\}$ on the next iteration.

Reception in accordance with the invention refers not only to a method for implementing it but also to the system for executing it and any transmission system incorporating that reception system.

The invention claimed is:

1. A reception method for communication over frequency-selective channels with a plurality of send antennas and a plurality of receive antennas, wherein said reception method is adapted to process data received by the receive antennas that, on sending, was successively:
   (A) modulated onto K channels, the number K being strictly greater than a number T of the plurality of send antennas;
   (B) spread with an N×K periodic spreading matrix or an N×K aperiodic spreading matrix where N is strictly greater than T, over K-dimensional vectors of the modulated data;
   wherein the reception method uses iteratively for processing the received data:
   filtering by means of a single linear filter adapted to process the received data, after subtraction of an interference estimate, to generate a K-dimensional vector corresponding to an evaluation of the sent modulated data before the spreading of the step (B), the filtering by means of the single linear filter taking account of the spatial diversity of the plurality of receive antennas;
   before said filtering, subtracting interference using an estimate of multi-antenna interference (MAI), intersymbol interference (ISI), and multi-user interference (MUI) previously regenerated from information computed on the basis of the K-dimensional vector generated by a previous filtering operation; and
   processing to generate an interference estimate for the received data from information computed on the basis of the K-dimensional vector, wherein the interference estimate for the received data is sent recursively to the next subtraction step,
   wherein, on sending, the data was coded before the step (A) and, on reception, said processing to generate the interference estimate for the received data uses weighted output vectorial processing, a decoding process, and regeneration of interference, wherein the weighted output vectorial processing processes the K-dimensional vector and generates probabilistic information on modulated data bits usable by the decoding process, wherein the decoding process generates a probabilistic quantity from said probabilistic information, wherein the regeneration of interference generates the interference estimate for the received data on the basis of the probabilistic quantity, and wherein the interference estimate for the received data is sent recursively to the next subtraction step.

2. The reception method according to claim 1, wherein the send spreading of the step (B) is effected with K strictly greater than N.

3. The reception method according to claim 1, wherein the reception method is adapted to process data that, on sending, was spread during the step (B), independently for each transmit antenna and with a number of channels per transmit antenna strictly greater than 1, the spreading matrix is a diagonal block matrix with a number of blocks equal to the number T of transmit antennas, and the blocks are constructed from N/T orthogonal codes.

4. The reception method according to claim 1, wherein the reception method is adapted to process data that, on sending, was spread during the step (B) by means of a spreading full matrix constructed from N orthogonal codes.

5. The reception method according to claim 1, wherein the single linear filter is derived using the criterion of minimizing the mean square error (MMSE).

6. The reception method according to claim 1, wherein the send spreading of the step (B) is effected periodically, the single linear filter is derived in accordance with the criteria for minimizing the unconditional mean square error, and the single linear filter is invariant in time for a given channel.

7. The reception method according to claim 1, wherein the single linear filter is a single user matched filter (SUMF).

8. The reception method according to claim 1, wherein the single linear filter is first derived in accordance with the criterion of minimizing the mean square error (MMSE) and from a given iteration becomes a single user matched filter (SUMF).

9. The reception method according to claim 1, wherein the filtering takes account of the spatial diversity of the plurality of receive antennas by maximizing the signal-to-noise ratio (SNR) after filtering.

10. The reception method according to claim 1, wherein dimensions of the single filter are computed using sliding windows.

11. The reception method according to claim 1, wherein the regeneration of interference generates the interference estimate for the received data from an estimate of the sent modulated data, wherein the estimate is computed using the criterion of minimizing the mean square error (MMSE) on the basis of extrinsic information that is a function of bits sent previously available after the decoding.

12. The reception method according to claim 1, wherein, on sending, the data was coded and interleaved before the step (A) and, on reception, said processing to generate the interference estimate for the received data uses:
the weighted output vectorial processing for weighted output vectorial processing based on the K-dimensional vector and decoding statistics resulting from the decoding to generate a statistic per modulated data bit;
de-interleaving at the bit level extrinsic statistics found from the probabilistic quantity generated previously;
the decoding process for weighted input and output decoding on the basis of the de-interleaved extrinsic statistics at the bit level to produce a probabilistic quantity over all of the bits;
interleaving at the bit level extrinsic statistics found from the probabilistic quantity new interleaved statistics, wherein the new interleaved statistics are sent recursively to the next step of weighted output vectorial processing; and
the regeneration of interference for regenerating interference to generate the interference estimate for the received data on the basis of an estimate of the sent modulated data computed in the sense of using the criterion of minimizing the mean square error (MMSE) from said new interleaved statistics, wherein the interference estimate for the received data is sent recursively to the next subtraction step.

13. The reception method according to claim 9, wherein the weighted output vectorial processing is derived in accordance with the maximum a posteriori (MAP) criterion.

14. The reception method according to claim 9, wherein the weighted output vectorial processing is effected by means of a sphere with lists decoding algorithm.

15. The reception method according to claim 9, wherein the weighted output vectorial processing is linear iterative interference cancellation derived in accordance with a minimized mean square error (MMSE) criterion.

16. The reception method according to claim 9, wherein the weighted output vectorial processing is linear iterative interference cancellation derived in accordance with the criterion of maximizing the signal-to-noise ratio (MAX SNR) using matched filters.

17. The reception method according to claim 9, wherein the weighted output vectorial processing comprises the successive implementation of a plurality of different vectorial processes from a given iteration or iterations, each of which vectorial processes are one of: an algorithm derived in accordance with the maximum a posteriori (MAP) criterion, or a sphere with lists decoding algorithm, or an algorithm derived in accordance with the criterion of minimizing the mean square error (MMSE), or an algorithm derived in accordance with the criterion of maximizing the signal-to-noise ratio (MAX SNR) using matched filters.

18. The reception method according to claim 9, wherein said probabilistic quantity after the decoding is the logarithm of a ratio of modulated data bit information a posteriori probabilities.

19. The reception method according to claim 18, wherein the decoding computes said probabilistic quantity by means of a Viterbi algorithm with weighted inputs and outputs.

20. The reception method according to claim 1, wherein the spreading of the sending step (B) is effected in the frequency domain and transmission before reception is of the multicarrier type.

21. The reception method according to claim 1, wherein the spreading of the sending step (B) is effected in the time domain and the transmission before reception is of the single-carrier type.

22. A transmission system, comprising:
a sending system comprising a plurality of send antennas and adapted to modulate onto K channels, the number K being strictly greater than the number T of send antennas, and to spread modulated data over the K-dimensional vectors with an N×K periodic spreading matrix or an N×K aperiodic spreading matrix where N is strictly greater than T;
a frequency-selective transmission channel; and
a reception system comprising a plurality of receive antennas and adapted to implement a reception method according to claim 1.

23. A reception system for communication over frequency-selective channels with a plurality of send antennas and a plurality of receive antennas, wherein the system is adapted to process data received via the receive antennas that, on sending, was successively:
(A) modulated onto K channels, the number K being strictly greater than a number T of the plurality of send antennas; and
(B) spread with an N×K periodic spreading matrix or an N×K aperiodic spreading matrix where N is strictly greater than T, over K-dimensional vectors of the modulated data;
wherein the reception system comprises for processing the received data:
a single linear filter adapted to process the received data, after subtraction of an interference estimate, to generate a K-dimensional vector corresponding to an evaluation of the sent modulated data before the spreading of the step (B), the single linear filter taking account of the spatial diversity of the plurality of receive antennas;
upstream of said single filter, an interference subtractor that subtracts an estimate of multi-antenna interference (MAI), intersymbol interference (ISI), and multi-user interference (MUI) previously regenerated from information computed on the basis of the K-dimensional vector generated by a previous filtering operation by the single filter;
processing means adapted to generate an interference estimate for the received data from information computed on the basis of the K-dimensional vector, wherein the interference estimate for the received data is then sent recursively to the subtractor;
wherein the reception system is adapted to be used iteratively for processing the received data, and
wherein, on sending, the data was coded before the step (A) and, in the reception system, said processing means adapted to generate the interference estimate for the received data include weighted output vectorial processing means, a decoder, and an interference regenerator, wherein the weighted output vectorial processing means is adapted to process the K-dimensional vector and to generate probabilistic information on modulated data bits usable by the decoder, wherein the decoder is adapted to generate a probabilistic quantity from said probabilistic information, wherein the interference regenerator generates the interference estimate for the received data on the basis of the probabilistic quantity, and wherein the interference estimate for the received data is sent recursively to the subtractor.

24. The reception system according to claim 23, wherein the single linear filter is derived using the criterion of minimizing the mean square error (MMSE).

25. The reception system according to claim 23, wherein the single linear filter is a single user matched filter (SUMF).

26. The reception system according to claim 23, wherein the single linear filter is first derived in accordance with the criterion of minimizing the mean square error (MMSE) and from a given iteration becomes a single user matched filter (SUMF).

27. The reception system according to claim 23, wherein said processing means adapted to generate the interference estimate for the received data include:
- the weighted output vectorial processing means for demodulating the latest K-dimensional vector and decoding statistics resulting from decoding for demodulation and to generate a statistic per modulated data bit;
- a de-interleaver of extrinsic statistics at the bit level found from the probabilistic quantity generated previously;
- the decoder including a weighted input and output decoder adapted to decode on the basis of the de-interleaved extrinsic statistics at the bit level to produce the probabilistic quantity over all of the bits;
- an interleaver adapted to interleave extrinsic statistics at the bit level found from the probabilistic quantity new interleaved statistics wherein the new interleaved statistics are sent recursively to the weighted output vectorial processing means; and
- the interference regenerator adapted to generate the interference estimate for the received data on the basis of an estimate of the sent modulated data computed using the criterion of minimizing the mean square error (MMSE) from said new interleaved statistics wherein the interference estimate for the received data is sent recursively to the subtractor.

28. A reception method for communication over frequency-selective channels with a plurality of send antennas and a plurality of receive antennas, wherein said reception method is adapted to process data received by the receive antennas that, on sending, was successively:
- (A) modulated onto K channels, the number K being strictly greater than a number T of the plurality of send antennas;
- (B) spread in the frequency or time domain, with an N×K periodic spreading matrix or an N×K aperiodic spreading matrix where N is strictly greater than T, over K-dimensional vectors of the modulated data;

wherein the reception method uses iteratively for processing the received data:
- filtering by means of a single linear filter adapted to process the received data, to generate a K-dimensional vector corresponding to an evaluation of the sent modulated data before the spreading of the step (B), the filtering by means of the single linear filter taking account of the spatial diversity of the plurality of receive antennas;
- after said filtering, subtracting interference using an estimate of multi-antenna interference (MAI), intersymbol interference (ISI), and multi-user interference (MUI) previously regenerated from information computed on the basis of the K-dimensional vector generated by a previous filtering operation; and
- processing to generate an interference estimate for the received data from information computed on the basis of the K-dimensional vector, wherein the interference estimate for the received data is sent recursively to the next subtraction step;

wherein on sending, the data was coded before the step (A) and, on reception, said processing to generate the interference estimate for the received data uses weighted output vectorial processing, a decoding process, and regeneration of interference, wherein the weighted output vectorial processing processes the K-dimensional vector and generates probabilistic information on modulated data bits usable by the decoding process, wherein the decoding process generates a probabilistic quantity from said probabilistic information, wherein the regeneration of interference generates the interference estimate for the received data on the basis of the probabilistic quantity, and wherein the interference estimate for the received data is sent recursively to the next subtraction step.

29. A reception system for communication over frequency-selective channels with a plurality of send antennas and a plurality of receive antennas, wherein the system is adapted to process data received via the receive antennas that, on sending, was successively:
- (A) modulated onto K channels, the number K being strictly greater than a number T of send antennas;
- (B) spread, with an N×K periodic spreading matrix or an N×K aperiodic spreading matrix where N is strictly greater than T, over K-dimensional vectors of the modulated data;

wherein the system comprises for processing the received data:
- a single linear filter adapted to process the received data, to generate a K-dimensional vector corresponding to an evaluation of the sent modulated data before the spreading of the step (B), the single linear filter taking account in particular of the spatial diversity of the plurality of receive antennas;
- downstream of said single filter, an interference subtractor that subtracts an estimate of multi-antenna interference (MAI), intersymbol interference (ISI), and multi-user interference (MUI) previously regenerated from information computed on the basis of the K-dimensional vector generated by a previous filtering operation by the single filter;
- processing means adapted to generate an interference estimate for the received data from information computed on the basis of the evaluation of the K-dimensional vector, wherein the interference estimate for the received data is sent recursively to the interference subtractor;

wherein the reception system is adapted to be used iteratively for processing the received data, wherein on sending, the data was coded before the step (A) and, on reception, said processing to generate the interference estimate for the received data uses weighted output vectorial processing, a decoding process, and regeneration of interference, wherein the weighted output vectorial processing processes the K-dimensional vector and generates probabilistic information on modulated data bits usable by the decoding process, wherein the decoding process generates a probabilistic quantity from said probabilistic information, wherein the regeneration of interference generates the interference estimate for the received data on the basis of the probabilistic quantity, and wherein the interference estimate for the received data is sent recursively to the next subtraction step.

\* \* \* \* \*